(12) United States Patent
Zhou et al.

(10) Patent No.: US 11,617,242 B2
(45) Date of Patent: Mar. 28, 2023

(54) LIGHTING APPARATUS

(71) Applicant: XIAMEN LEEDARSON LIGHTING CO., LTD, Fujian (CN)

(72) Inventors: Lingfeng Zhou, Fujian (CN); Zongyan Liu, Fujian (CN); Bin Liu, Fujian (CN); Liangliang Cao, Fujian (CN); Yueqiang Zhang, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/387,722

(22) Filed: Jul. 28, 2021

(65) Prior Publication Data

US 2022/0039224 A1 Feb. 3, 2022

(30) Foreign Application Priority Data

Jul. 28, 2020 (CN) .......................... 202021514696.7
Jul. 28, 2020 (CN) .......................... 202021524646.7
Aug. 13, 2020 (CN) .......................... 202021686919.8

(51) Int. Cl.
*H05B 45/10* (2020.01)
*H05B 47/19* (2020.01)
*H05B 45/325* (2020.01)
*H02M 3/24* (2006.01)

(52) U.S. Cl.
CPC .............. *H05B 45/10* (2020.01); *H02M 3/24* (2013.01); *H05B 45/325* (2020.01); *H05B 47/19* (2020.01)

(58) Field of Classification Search
None
See application file for complete search history.

(56) References Cited

U.S. PATENT DOCUMENTS

| 2007/0228999 | A1* | 10/2007 | Kit | .......................... | H05B 45/10 |
| | | | | | 315/291 |
| 2012/0091899 | A1* | 4/2012 | Tokura | ................. | H05B 47/195 |
| | | | | | 315/149 |
| 2014/0139116 | A1* | 5/2014 | Reed | ...................... | H05B 47/11 |
| | | | | | 315/153 |

FOREIGN PATENT DOCUMENTS

| EP | 1887836 B1 * | 3/2012 | .......... A61N 5/0616 |
| WO | WO-2009005291 A2 * | 1/2009 | ......... H05B 33/0803 |

* cited by examiner

*Primary Examiner* — Dedei K Hammond
(74) *Attorney, Agent, or Firm* — Chun-Ming Shih; Lanway IPR Services

(57) ABSTRACT

A lighting apparatus includes a light source, a rectifier circuit, a DC-DC converter, an adjustment circuit and a controller. The rectifier circuit converts an AC power to a raw direct current. The adjustment circuit provides an adjustment signal corresponding a light intensity setting of the light source. The controller is coupled to the DC-DC converter and the adjustment circuit. The controller receives the adjustment signal for generating a first PWM signal. The DC-DC converter receives the first PWM signal. The DC-DC converter converts the raw direct current to an output current according to a first duty ratio of the first PWM signal. The output current is supplied to the light source corresponding to the light intensity setting.

17 Claims, 14 Drawing Sheets

LIGHTING APPARATUS

FIELD

The present invention is related to a lighting apparatus, and more particularly related to a lighting apparatus with a light intensity adjustment function.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to consider requirements of users. In past, when users buy a light device, they can only decide to turn on or turn off a light device.

If they acquire a light device with a default light intensity, the light device simply reaches the default light intensity.

However, sometimes people may have different needs, e.g. energy saving or other consideration, to adjust the light intensity of the light device.

It is therefore beneficial to provide a simple design to solve this technical problem.

SUMMARY

In some embodiments, a lighting apparatus includes a light source, a rectifier circuit, a DC-DC converter, an adjustment circuit and a controller.

The rectifier circuit converts an AC power to a raw direct current.

The adjustment circuit provides an adjustment signal corresponding a light intensity setting of the light source.

The controller is coupled to the DC-DC converter and the adjustment circuit.

The controller receives the adjustment signal for generating a first PWM signal.

The DC-DC converter receives the first PWM signal.

The DC-DC converter converts the raw direct current to an output current according to a first duty ratio of the first PWM signal.

The output current is supplied to the light source corresponding to the light intensity setting.

In some embodiments, the light intensity setting is a continuous value selected within a value range.

In some embodiments, the lighting apparatus may also include a manual switch.

The manual switch is coupled to the adjustment circuit for changing the adjustment signal by operating the manual switch.

In some embodiments, the manual switch is a rotation switch for generating a continuous switch signal.

In some embodiments, the manual switch is concealed when the lighting apparatus is installed to a platform.

In some embodiments, the adjustment circuit receives an external command to generate the adjustment signal.

In some embodiments, the controller monitors the raw current to generate the first PWM signal.

In some embodiments, the controller references the output current to generate the first PWM signal.

In some embodiments, the light source has multiple LED modules, the controller activates a portion of the LED modules based on the adjustment signal.

In some embodiments, the controller alternatively turns on and turns off a portion of the multiple LED modules to increase a life span of the lighting apparatus.

In some embodiments, the lighting apparatus may also include a suppression circuit.

The suppression circuit is coupled to the rectifier circuit for suppressing a peak pattern of the raw direct current.

In some embodiments, the lighting apparatus may also include a first filter circuit.

The first filter circuit is used for changing a first signal pattern of the raw direct current.

In some embodiments, the lighting apparatus may also include a second filter circuit.

The second filter circuit is used for changing a second signal pattern of the output current.

In some embodiments, the adjustment circuit generates a second PWM signal.

The controller determines the first PWM signal based on a second duty ratio of the second PWM signal.

In some embodiments, the first PWM signal includes multiple sub-signals respectively supplied the DC-DC converters to generate multiple sub-output currents respectively supplied to multiple LED modules of the light source.

The multiple LED modules are different types with different light parameters.

In some embodiments, the sub-signals have a constant linear relation.

In some embodiments, the sub-signals are varied based on a predetermined mapping relation.

In some embodiments, when one sub-signal reaches a maximum value, other sub-signals are increased to compensate said one sub-signal to achieve a required light intensity of the Igith source.

In some embodiments, the controller sends a wireless command to a neighbor light device to adjust a light intensity of the neighbor light device based on the first PWM signal.

In some embodiments, the controller sends a wireless command to a neighbor light device to increase a light intensity of the neighbor light device when a light intensity of the light source is decreased.

The lighting apparatus and the neighbor light device are classified in a same group.

DETAILED DESCRIPTION

Figure 14:
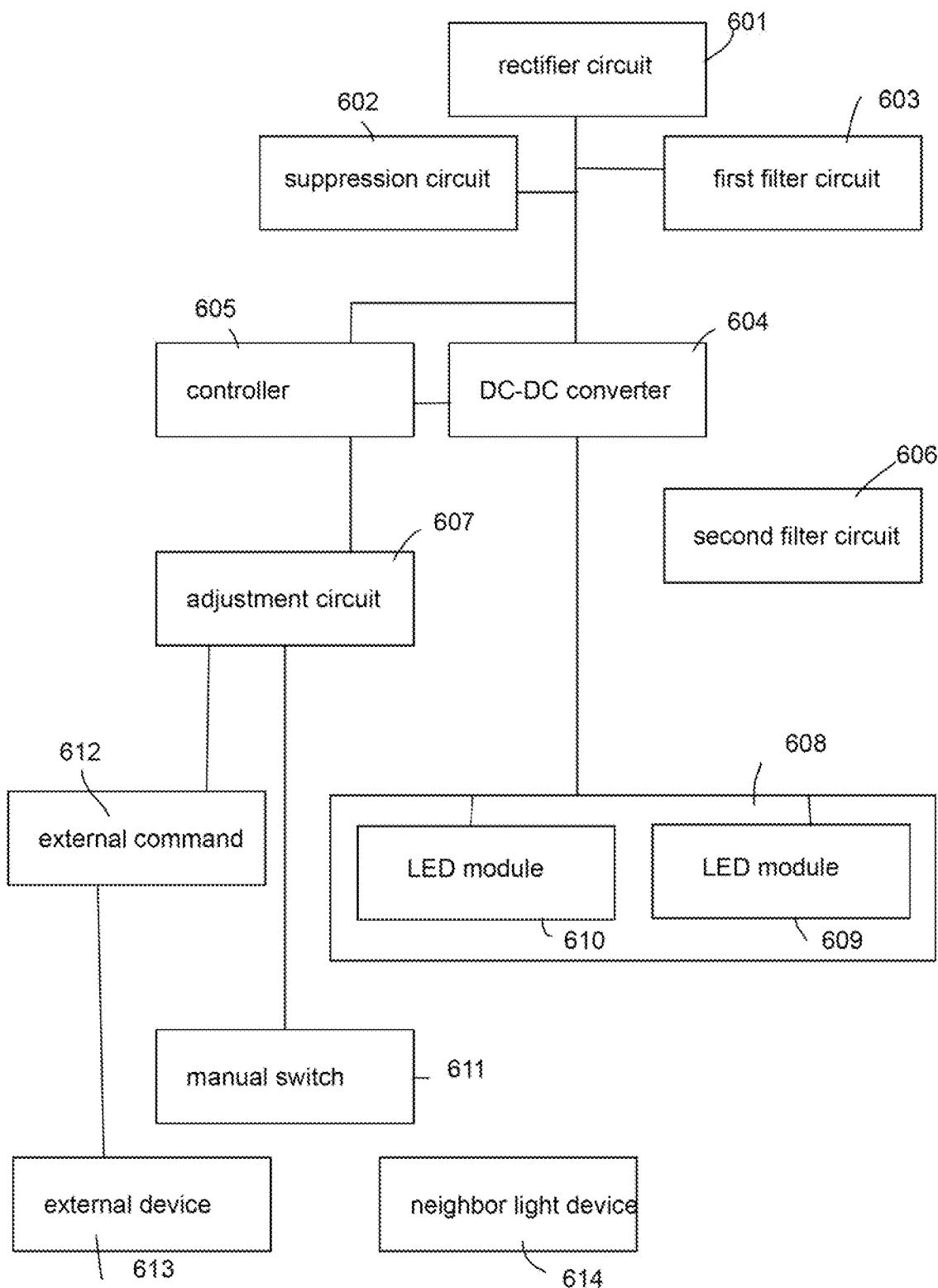
FIG. 14 shows a concept diagram of another embodiment.

In FIG. 14, a lighting apparatus includes a light source 608, a rectifier circuit 601, a DC-DC converter 604, an adjustment circuit 607 and a controller 605.

The rectifier circuit 601 converts an AC power to a raw direct current. For example, a 110V AC power is converted to a DC current by the rectifier circuit 601. Bridge circuit and other components may be applied to construct such a rectifier circuit 601. Various embodiments may be found in known field for persons of ordinary skilled in the art.

The adjustment circuit 607 provides an adjustment signal corresponding a light intensity setting of the light source 608.

Specifically, users may acquire the lighting apparatus with the light source 608. The light source 608 may be labeled with a maximum light intensity value, e.g. 14 W light bulb light intensity. However, users may want to adjust an actual light intensity when using the lighting apparatus, e.g. a light bulb. In such case, users may adjust a manual switch 611 like a rotation switch on the light bulb. The adjustment circuit 607 is coupled to the manual switch 611 and converts a setting of the manual switch 611 to generate an adjustment signal like a variable resistor value or a status value.

The controller 605 is coupled to the DC-DC converter 604 and the adjustment circuit 607.

The controller 605 receives the adjustment signal for generating a first PWM signal. Signals are invisible and thus they are described in the specification only. People of ordinary skilled in the art would know how to enable the embodiments described here by reference to the module blocks illustrated in the drawings that send and receive the corresponding signals.

The DC-DC converter 604 receives the first PWM signal.

The DC-DC converter 604 converts the raw direct current to an output current according to a first duty ratio of the first PWM signal.

PWM refers to Pulse Width Modulation, which is a technology for adjust an accumulated current output according to a duty ratio of a PWM signal. For example, a constant direct current may be converted to another direct current with an accumulated direct volume by turning off the direct current output in certain time slots. For example, when the first PWM signal has a duty ratio of 40%, the output current may have a 40% accumulated current output with respect to the raw direct current.

The output current is supplied to the light source 608 corresponding to the light intensity setting. For example, users may acquire a 14 W light bulb device but would only want the light bulb device to generate 8 W light intensity, which may be set via a manual switch 611 as mentioned above.

In some embodiments, the light intensity setting is a continuous value selected within a value range. For example, the manual switch 611 may be a rotation switch that may be used for assign a continuous like 8.231 W, 8.7424124 W within a predetermined range 6 W to 14 W light intensity.

In some embodiments, the lighting apparatus may also include a manual switch 611.

The manual switch 611 is coupled to the adjustment circuit 607 for changing the adjustment signal by operating the manual switch 611.

In some embodiments, the manual switch 611 is a rotation switch for generating a continuous switch signal.

In some embodiments, the manual switch is concealed when the lighting apparatus is installed to a platform. For example, the manual switch may be placed on a neck portion of a light bulb or a back cover of a panel light. When the lighting apparatus is installed to an Edison socket or a ceiling, the manual switch is concealed. The manual switch 611 is designed to be set for once and used constantly unless users would like to change the value again in such embodiments.

In some embodiments, the adjustment circuit 607 receives an external command 612 to generate the adjustment signal. For example, an external device 613 like a remote controller, a mobile phone or a server may send external command 612 that indicates the light intensity setting. The external command 612 is used as an alternative method for setting the adjustment signal.

In some embodiments, the controller 605 monitors the raw current to generate the first PWM signal. For example, a feedback circuit design is provided for the controller 605 to determine a corresponding duty ratio to be used in the DC-DC converter 604.

The DC-DC converter 604 is a converting circuit for converting a direct current to another direct current, e.g. changing a duty ratio or a voltage volume.

In some embodiments, the controller 605 references the output current to generate the first PWM signal.

In some embodiments, the light source 608 has multiple LED modules 610, 609. The controller 605 activates a portion of the LED modules 609, 610 based on the adjustment signal.

In some embodiments, the controller 605 alternatively turns on and turns off a portion of the multiple LED modules 609, 610 to increase a life span of the lighting apparatus.

In some embodiments, the lighting apparatus may also include a suppression circuit 602.

The suppression circuit 602 is coupled to the rectifier circuit 601 for suppressing a peak pattern of the raw direct current. For example, when a peak exists in the raw direct current, the suppression circuit 602 may remove the peak in the raw direct current. This may be implemented by various methods known by persons of ordinary skilled in the art like use of capacitor or transistors.

In some embodiments, the lighting apparatus may also include a first filter circuit 603.

The first filter circuit 603 is used for changing a first signal pattern of the raw direct current.

In some embodiments, the lighting apparatus may also include a second filter circuit 606.

The second filter circuit 606 is used for changing a second signal pattern of the output current.

In some embodiments, the adjustment circuit 607 generates a second PWM signal.

The controller 605 determines the first PWM signal based on a second duty ratio of the second PWM signal.

In some embodiments, the first PWM signal includes multiple sub-signals respectively supplied the DC-DC converters to generate multiple sub-output currents respectively supplied to multiple LED modules of the light source. For example, the LED module 609 and the LED module 610 have different color temperatures or colors. The controller 605 may generate corresponding PWM signals respectively for the LED module 609 and the LED module 610.

The multiple LED modules are different types with different light parameters.

In some embodiments, the sub-signals have a constant linear relation. For example, the currents of the LED modules 609, 610 are increased or decreased with the same ratio.

In some embodiments, the sub-signals are varied based on a predetermined mapping relation. For example, when an overall light intensity is set, different variation ratios are determined according to a predetermined relation for LED modules of different color temperatures.

In some embodiments, when one sub-signal reaches a maximum value, other sub-signals are increased to compensate said one sub-signal to achieve a required light intensity of the Igith source. Other LED modules are used to compensate the LED module that cannot be increased with more light intensity.

In some embodiments, the controller 605 sends a wireless command to a neighbor light device 614 to adjust a light intensity of the neighbor light device based on the first PWM signal.

In some embodiments, the controller 605 sends a wireless command to a neighbor light device 614 to increase a light intensity of the neighbor light device when a light intensity of the light source is decreased.

The lighting apparatus and the neighbor light device are classified in a same group.

Such design makes lighting devices more intelligent.

Please refer to FIG. 1 to FIG. 13, which show some other detailed embodiments. Reference numerals of the same values refer to the same components among drawings.

Figure 1:
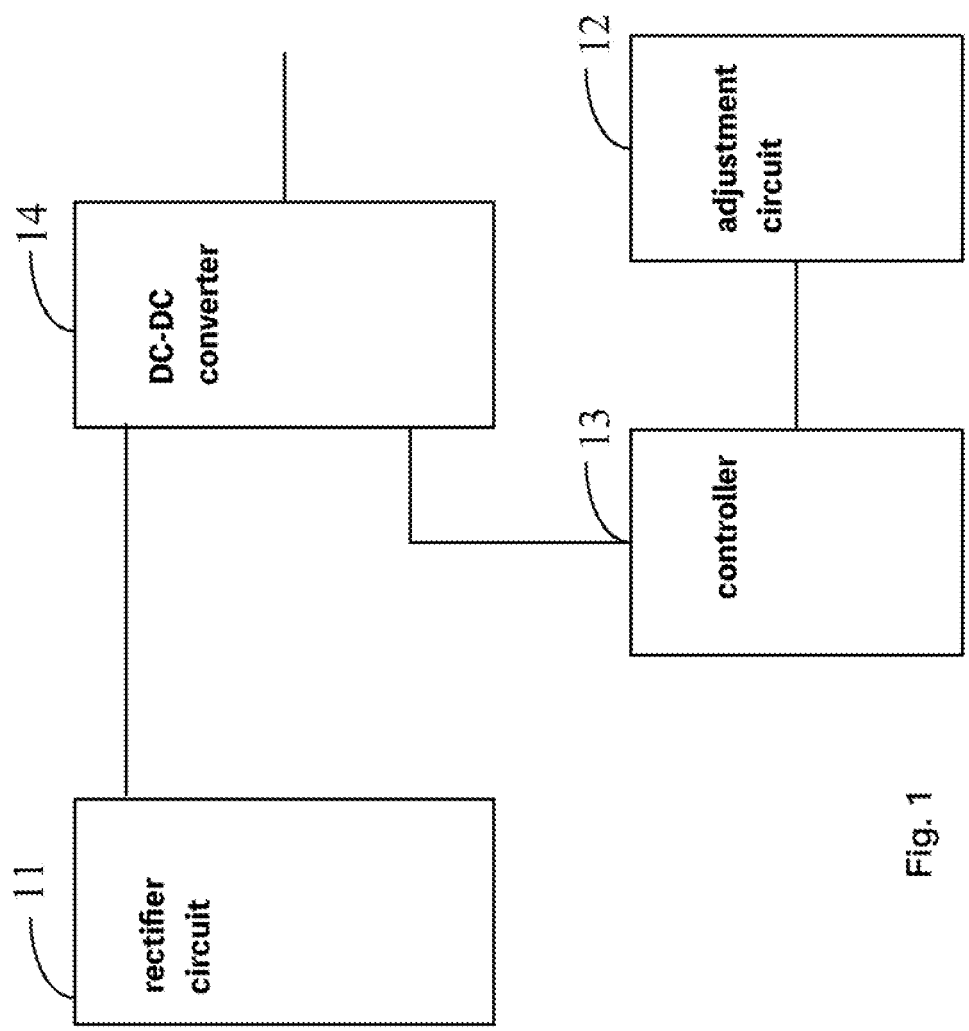
FIG. 1 illustrates a circuit diagram of a first embodiment.

In FIG. 1, a lighting apparatus includes a rectifier circuit 11, a DC-DC converter 14, a controller 13 and an adjustment circuit 12. These components are working as mentioned above.

Figure 2:
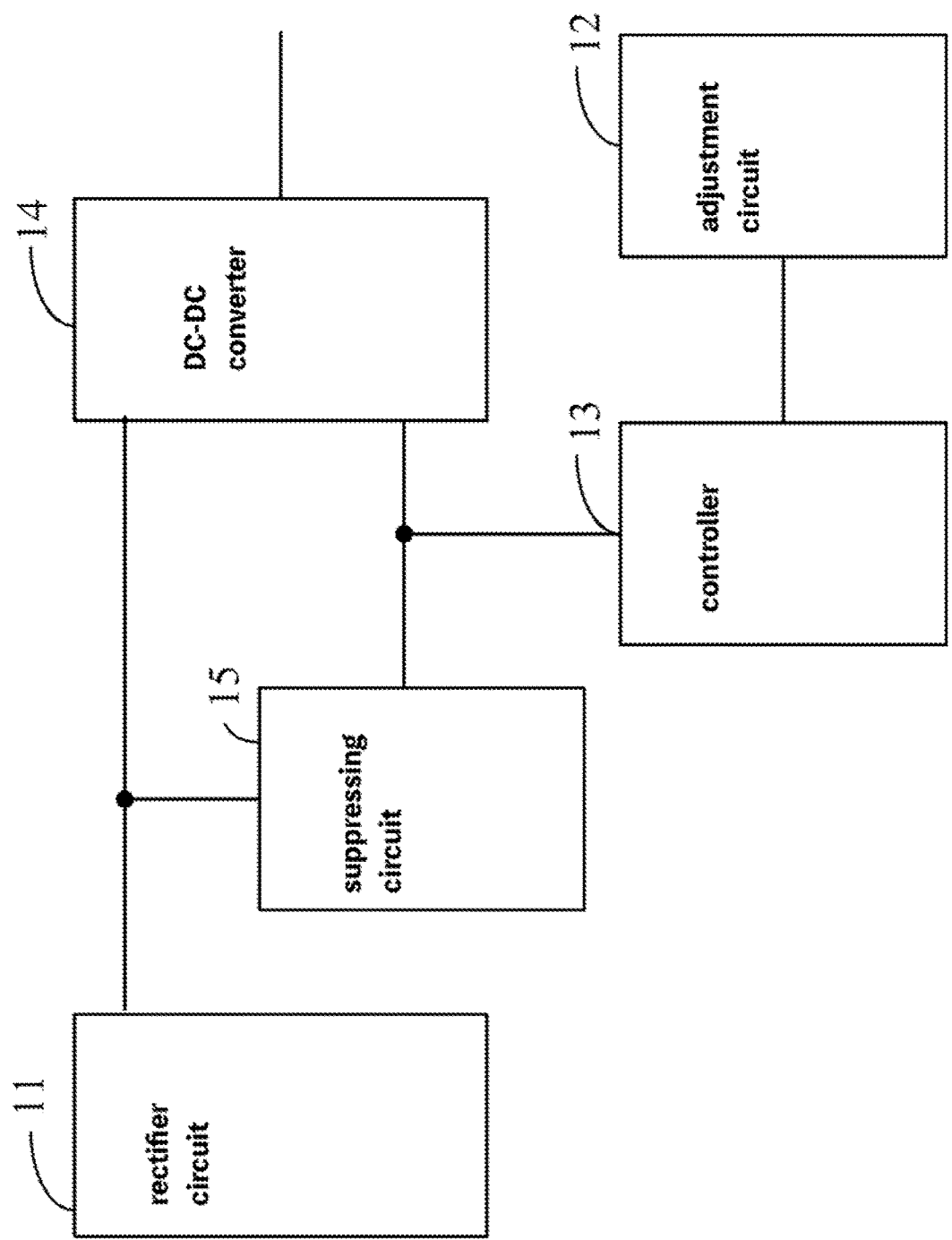
FIG. 2 illustrates a second embodiment of a circuit diagram.

In FIG. 2, the lighting apparatus further has a suppressing circuit 15 for suppressing a peak in the raw direct current.

Figure 3:
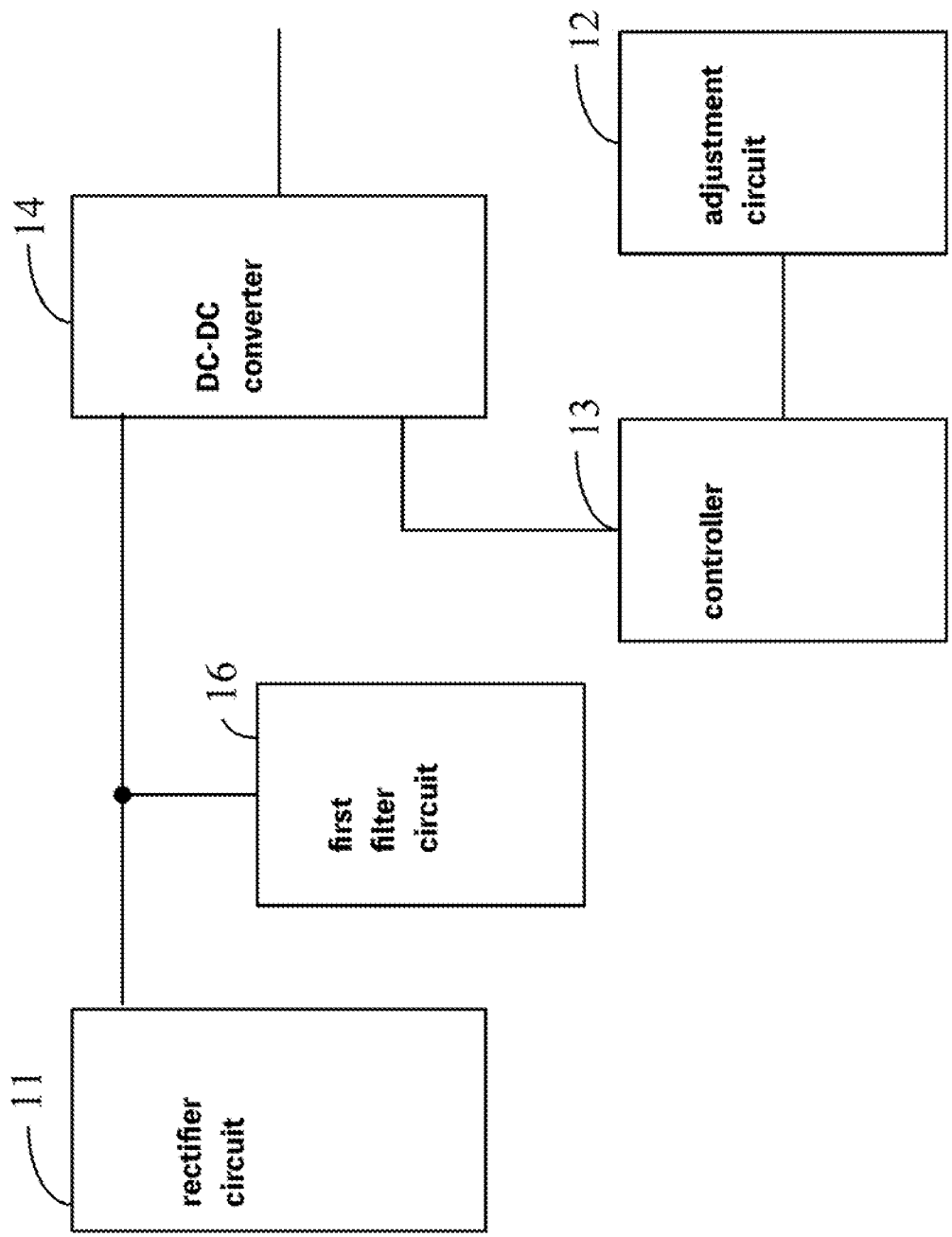
FIG. 3 illustrates another embodiment of a circuit diagram.

In FIG. 3, a first filter circuit 16 is used for filtering the raw direct current.

Figure 4:
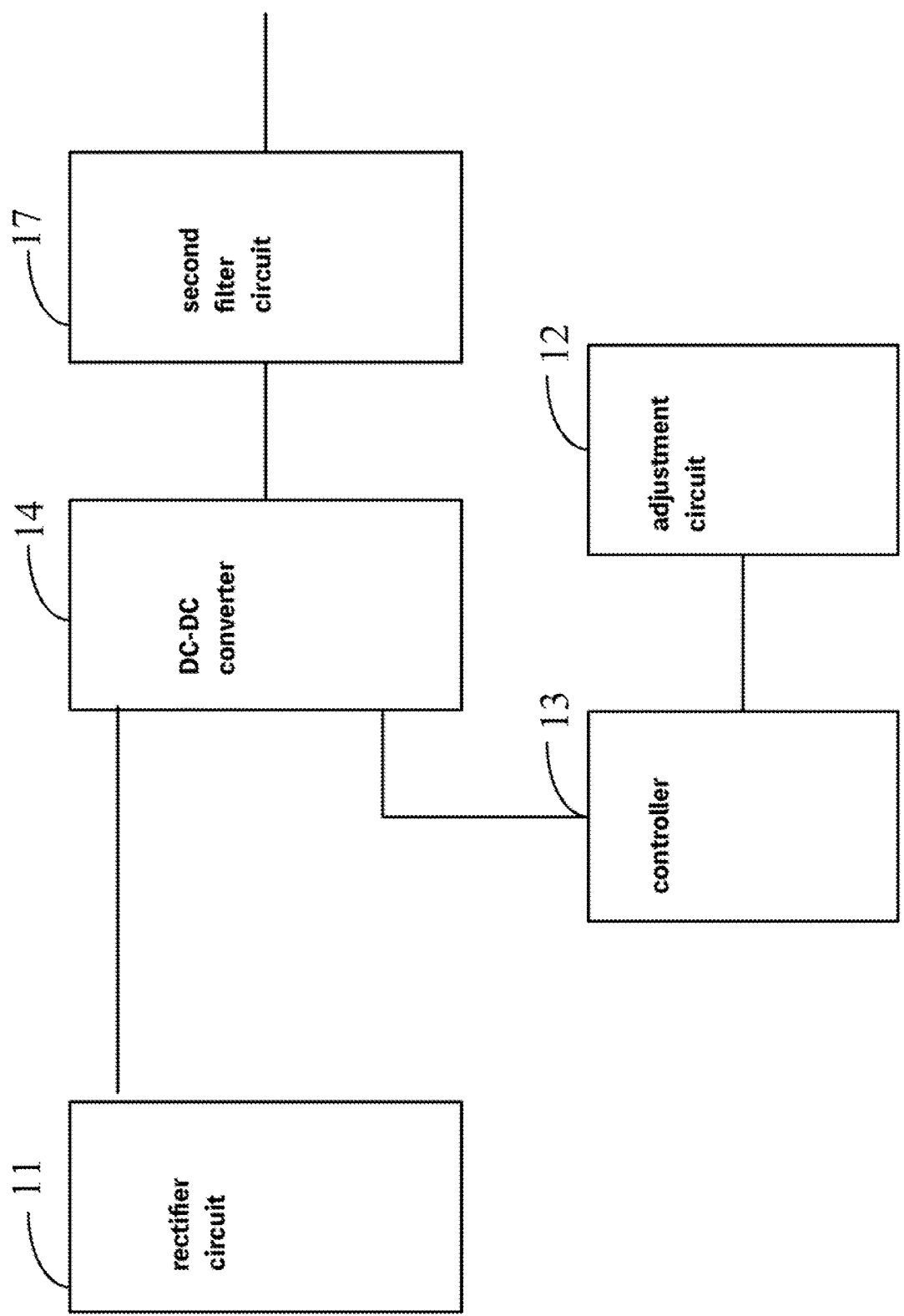
FIG. 4 illustrates another embodiment of a circuit diagram.

In FIG. 4, a second filter circuit 17 is used for filtering the output current.

Figure 5:
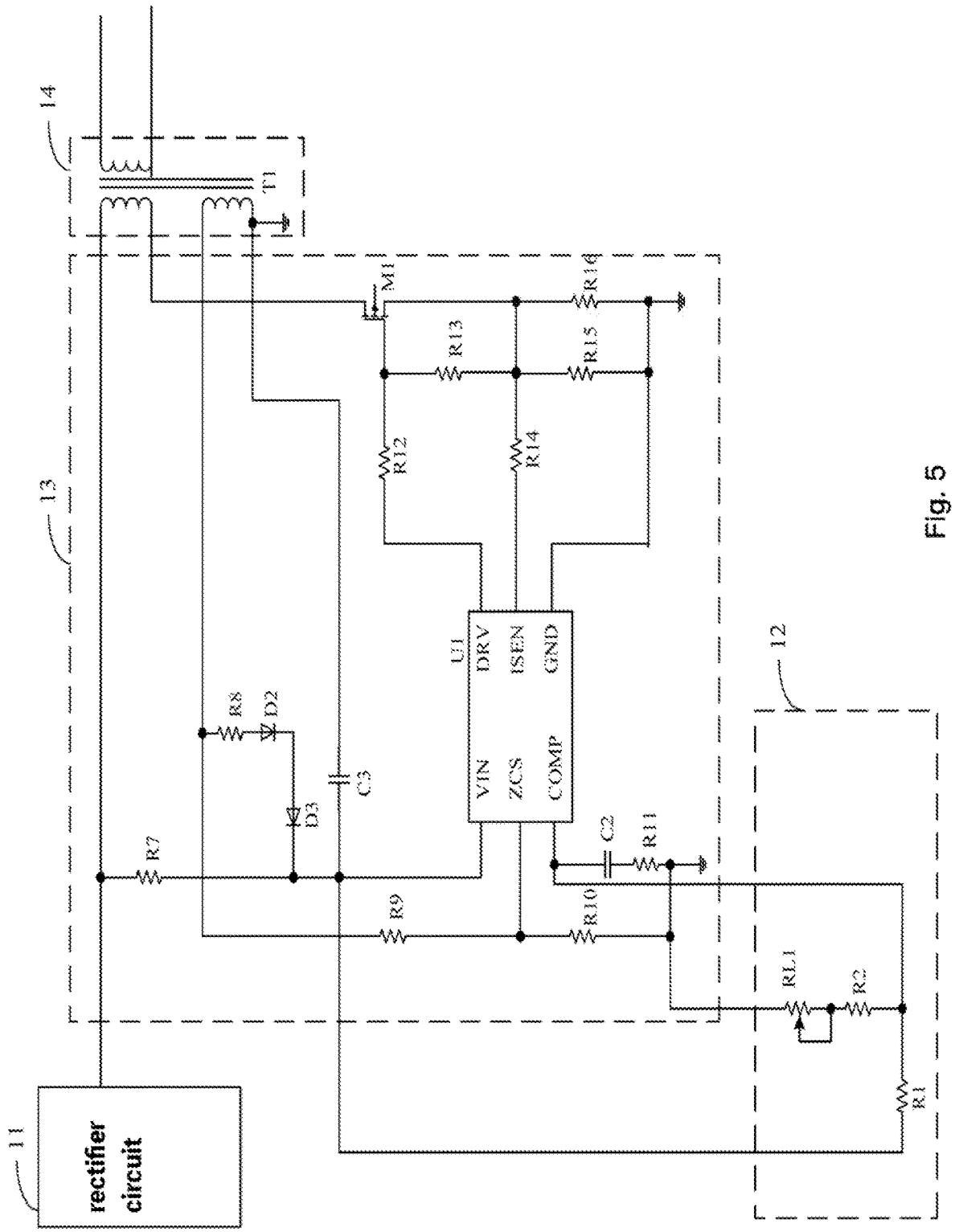
FIG. 5 illustrates an example circuit of a lighting apparatus.

FIG. 5 shows a detailed circuit example showing the controller 13, the DC-DC converter 14 and the adjustment circuit 12.

Figure 6:
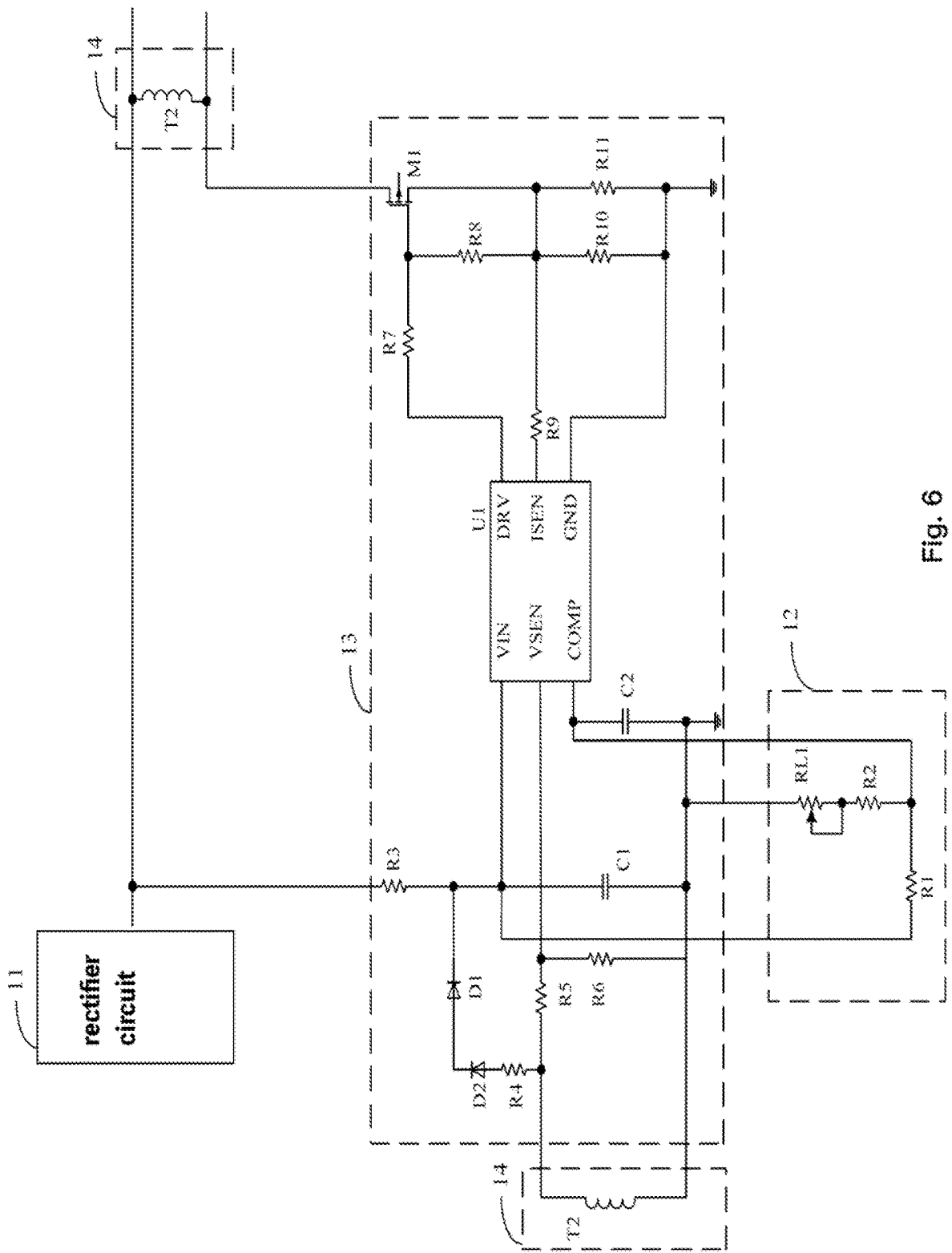
FIG. 6 illustrates another circuit example of a lighting apparatus.

FIG. 6 shows another detailed circuit example showing the DC-DC converter 14 and the controller 13 and the adjustment circuit 12.

Figure 7:
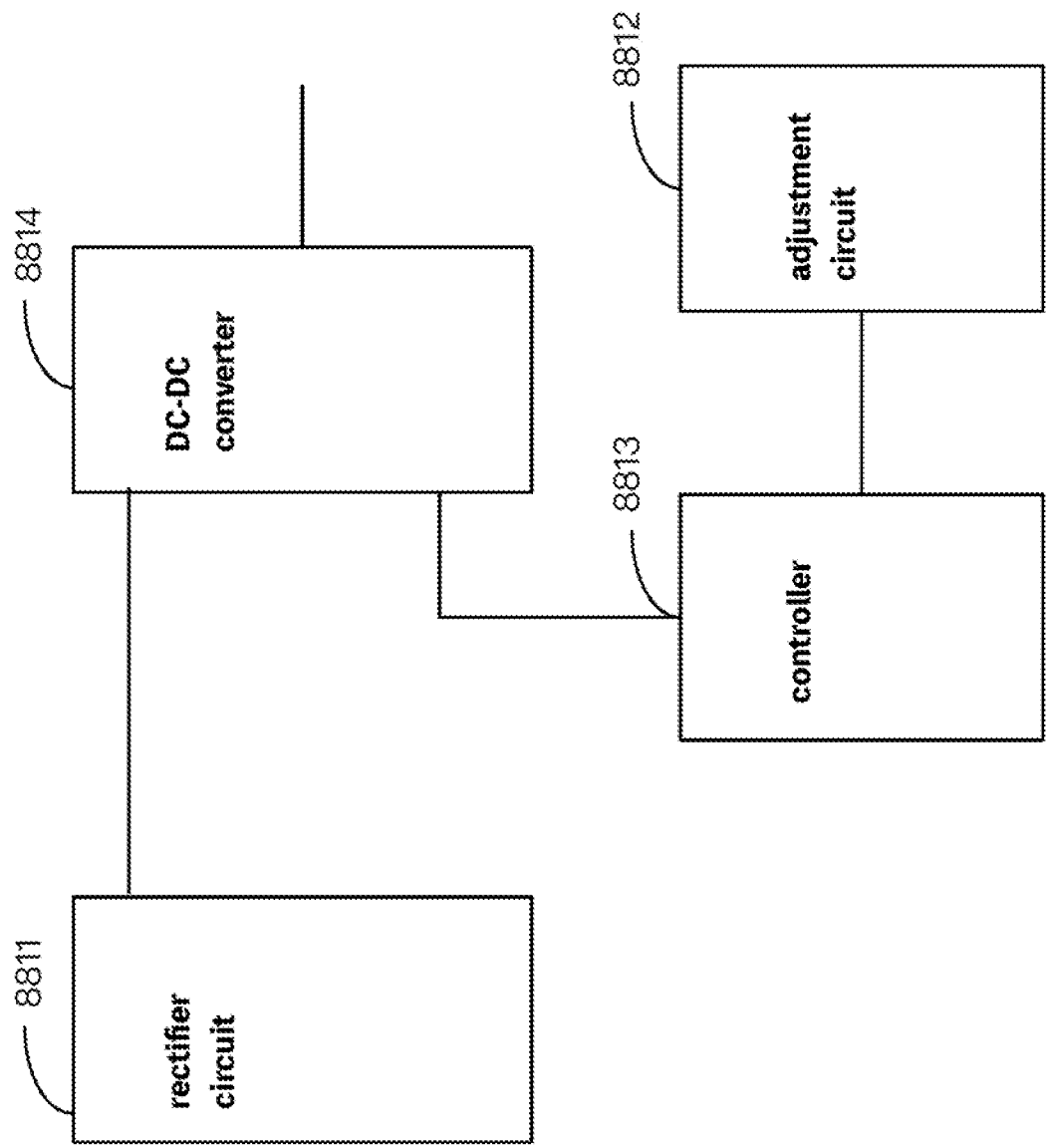
FIG. 7 illustrates another circuit diagram of a lighting apparatus.

FIG. 7 shows a lighting apparatus with a rectifier circuit 8811, a DC-DC converter 8814, a controller 8813 and the adjustment circuit 8812.

Figure 8:
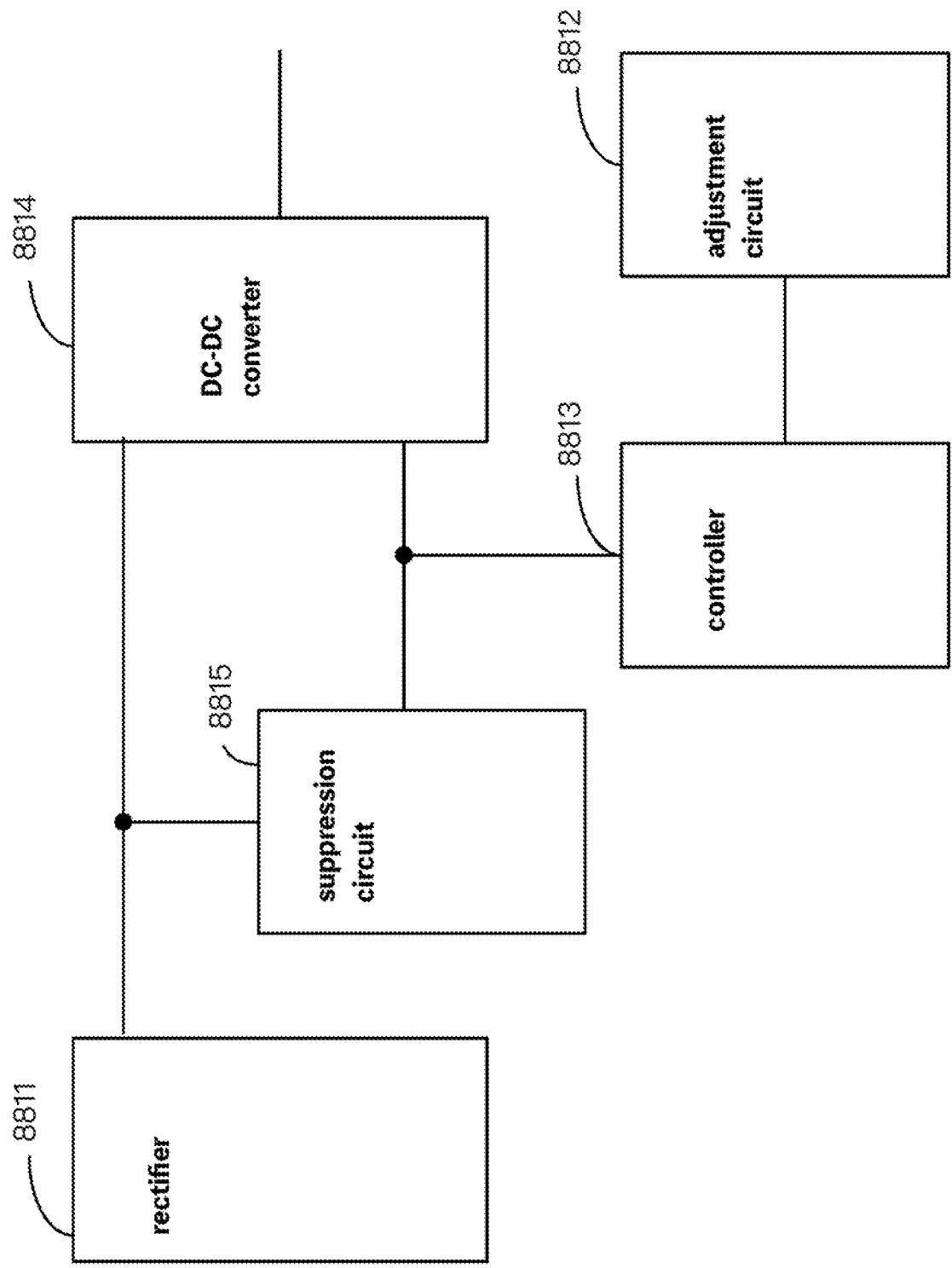
FIG. 8 illustrates another circuit diagram of a lighting apparatus.

FIG. 8 shows a suppression circuit 8815 in addition to the components mentioned in FIG. 7.

Figure 9:
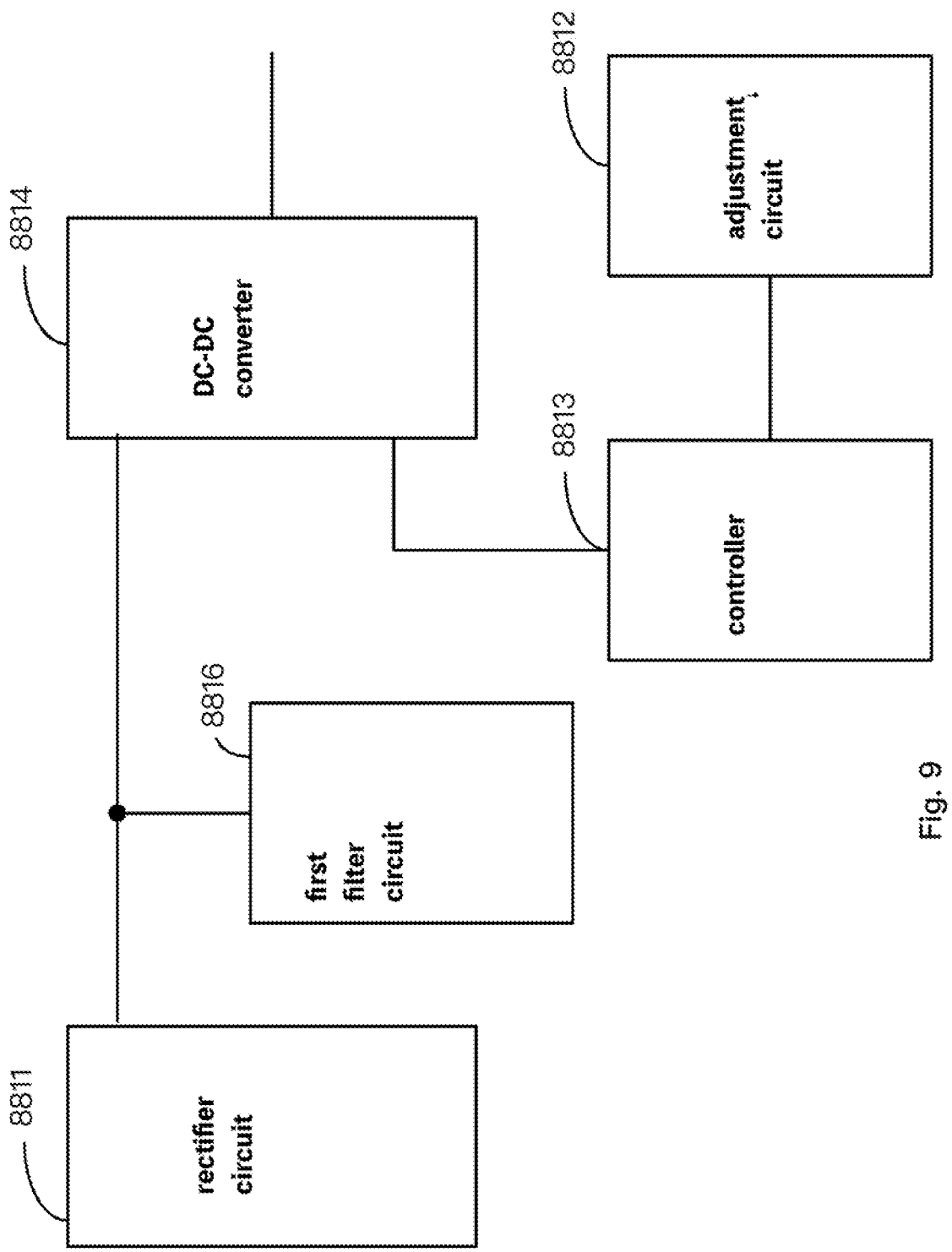
FIG. 9 illustrates another circuit diagram of a lighting apparatus.

FIG. 9 shows an additional first filter circuit 8816.

Figure 10:
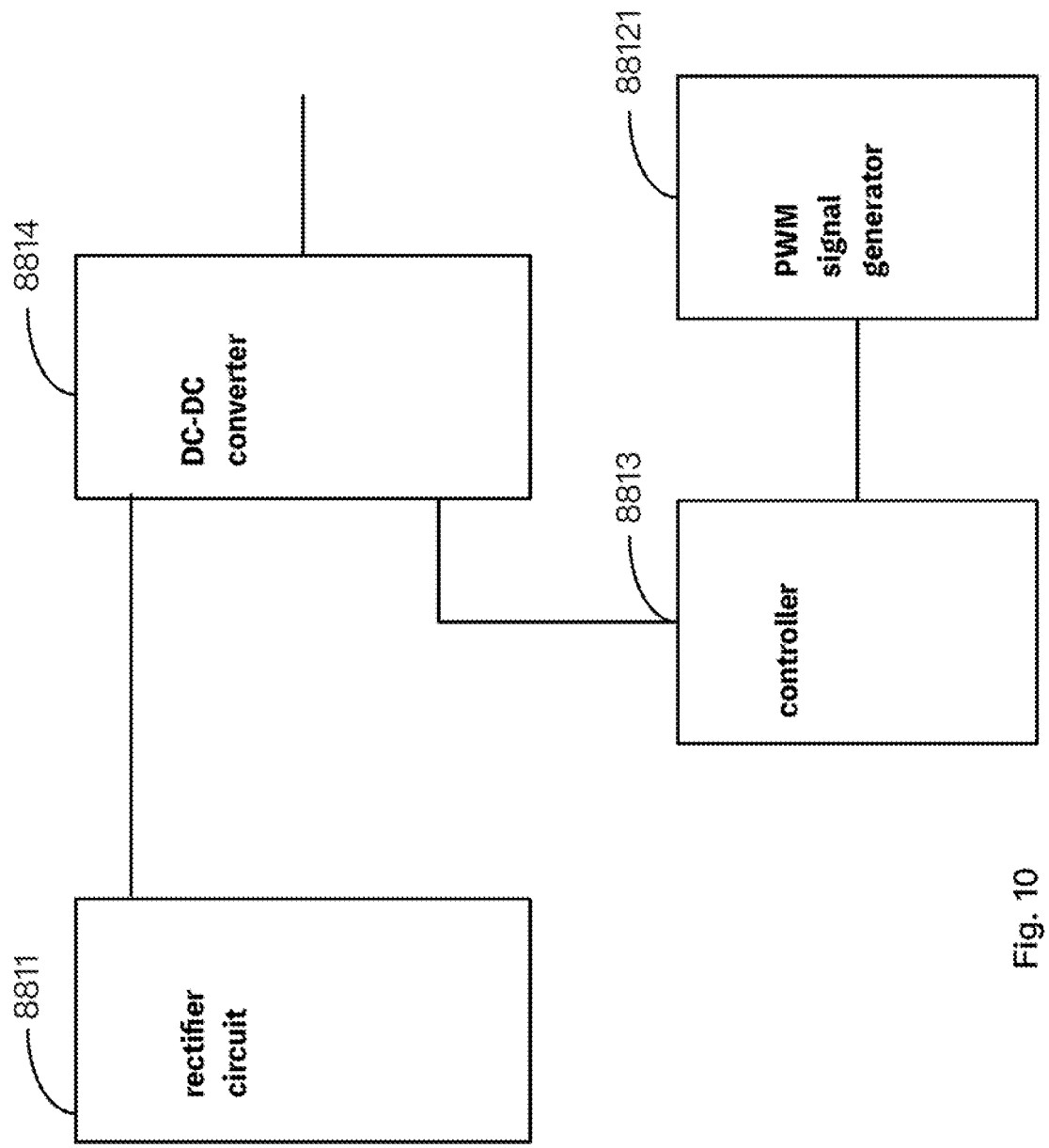
FIG. 10 illustrates another circuit diagram of a lighting apparatus.

FIG. 10 shows a PWM signal generator 88121 for generating a PWM signal.

Figure 11:
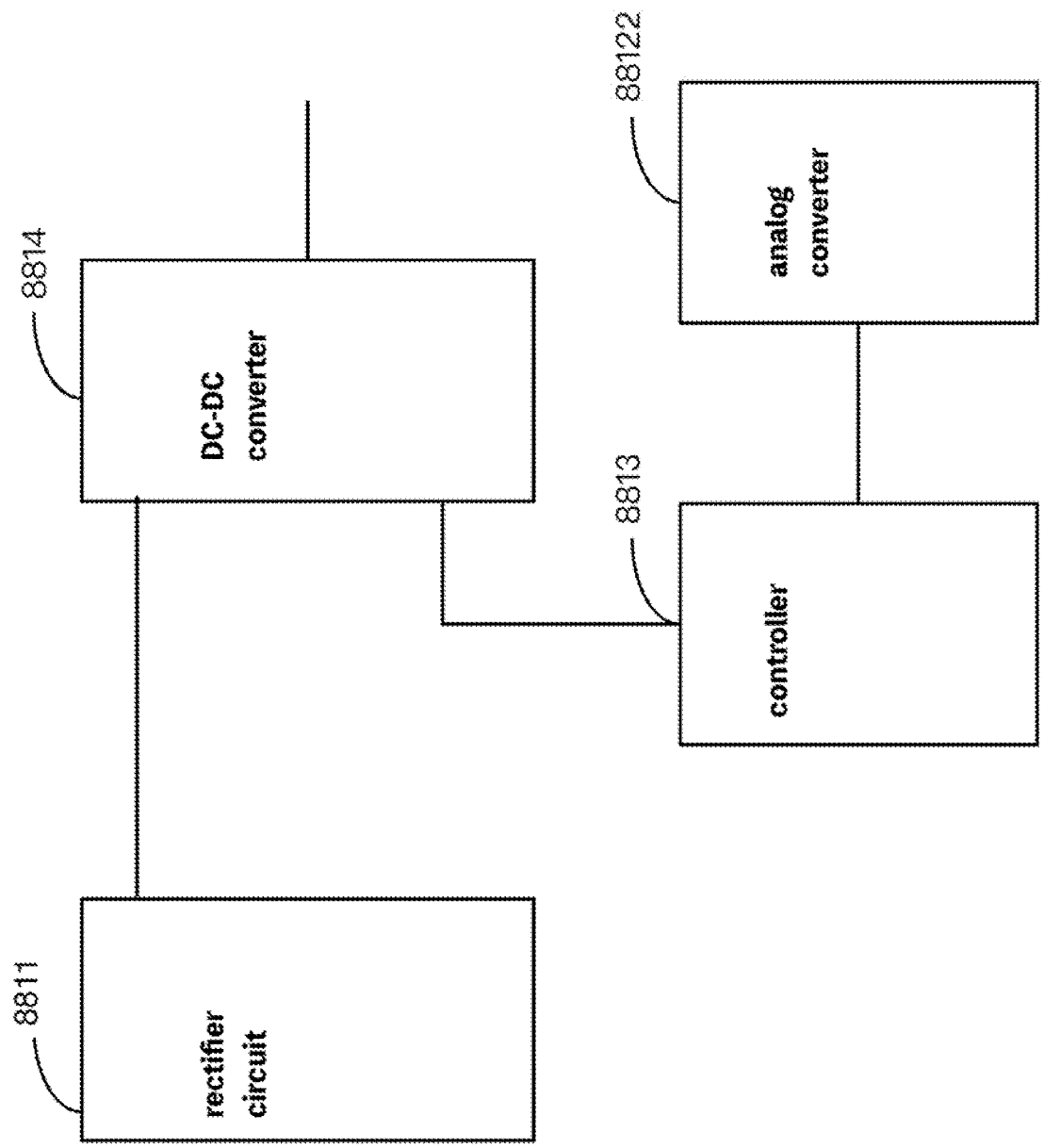
FIG. 11 illustrates another circuit diagram of a lighting apparatus.

FIG. 11 shows an analog converter 88122 for generating an analog signal supplied to the controller 8813.

Figure 12:
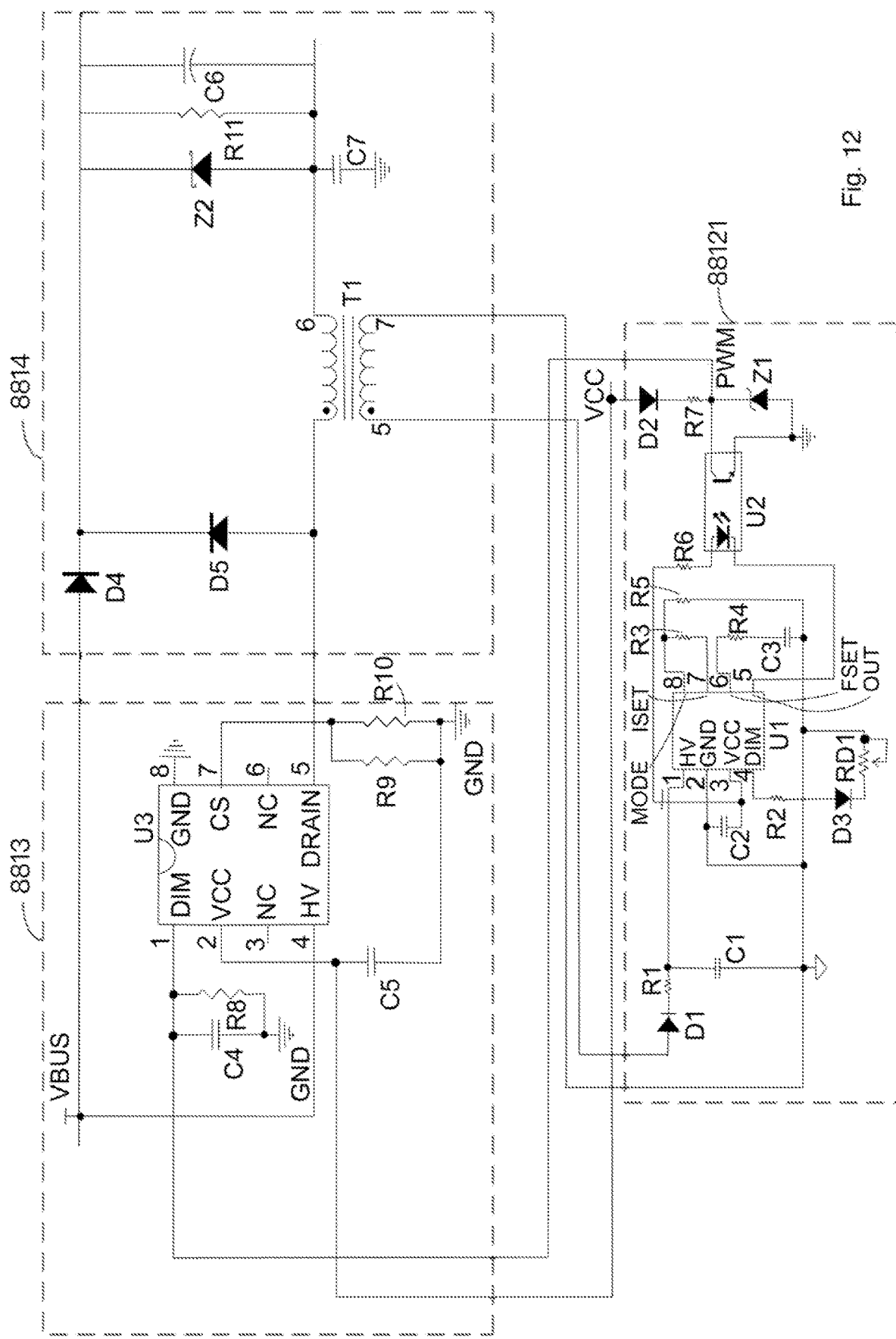
FIG. 12 illustrates a circuit example.

FIG. 12 shows a circuit example for implementing the circuits mentioned in other drawings.

Figure 13:
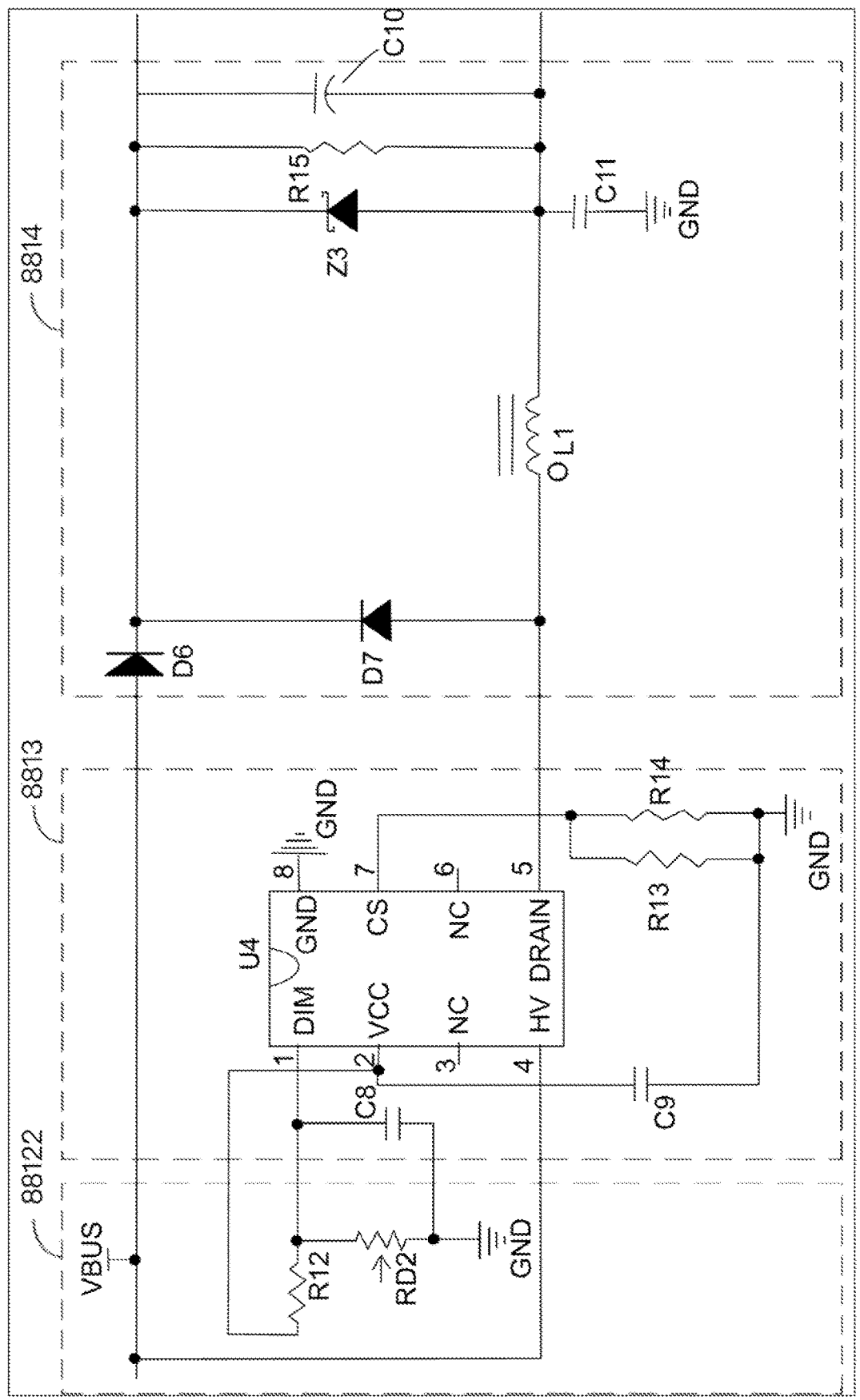
FIG. 13 illustrates another circuit example.

FIG. 13 shows a circuit example for implementing the circuits mentioned in other drawings.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a light source;
   a rectifier circuit for converting an AC power to a raw direct current;
   a DC-DC converter;
   an adjustment circuit for providing an adjustment signal corresponding a light intensity setting of the light source; and
   a controller coupled to the DC-DC converter and the adjustment circuit, wherein the controller receives the adjustment signal for generating a first PWM signal, wherein the DC-DC converter receives the first PWM signal, wherein the DC-DC converter converts the raw direct current to an output current according to a first duty ratio of the first PWM signal, wherein the output current is supplied to the light source corresponding to the light intensity setting, wherein the light source has multiple LED modules, the controller activates a portion of the LED modules based on the adjustment signal corresponding to the light intensity, wherein the light source has multiple LED modules, the controller activates a portion of the LED modules based on the adjustment signal corresponding to the light intensity, wherein the controller alternatively turns on and turns off a portion of the multiple LED modules to increase a life span of the lighting apparatus, wherein the controller sends a wireless command to a neighbor light device to increase a light intensity of the neighbor light device when a light intensity of the light source is decreased, wherein the lighting apparatus and the neighbor light device are classified in a same group to increase the life span of the lighting apparatus and the neighbor light device.

2. The lighting apparatus of claim 1, wherein the light intensity setting is a continuous value selected within a value range.

3. The lighting apparatus of claim 1, further comprising a manual switch, wherein the manual switch is coupled to the adjustment circuit for changing the adjustment signal by operating the manual switch.

4. The lighting apparatus of claim 3, wherein the manual switch is a rotation switch for generating a continuous switch signal.

5. The lighting apparatus of claim 3, wherein the manual switch is concealed when the lighting apparatus is installed to a platform.

6. The lighting apparatus of claim 1, wherein the adjustment circuit receives an external command to generate the adjustment signal.

7. The lighting apparatus of claim 1, wherein the controller monitors the raw current to generate the first PWM signal.

8. The lighting apparatus of claim 1, wherein the controller references the output current to generate the first PWM signal.

9. The lighting apparatus of claim 1, further comprising a suppression circuit, wherein the suppression circuit is coupled to the rectifier circuit for suppressing a peak pattern of the raw direct current.

10. The lighting apparatus of claim 1, further comprising a first filter circuit, wherein the first filter circuit is used for changing a first signal pattern of the raw direct current.

11. The lighting apparatus of claim 1, further comprising a second filter circuit, wherein the second filter circuit is used for changing a second signal pattern of the output current.

12. The lighting apparatus of claim 1, wherein the adjustment circuit generates a second PWM signal, wherein the controller determines the first PWM signal based on a second duty ratio of the second PWM signal.

13. The lighting apparatus of claim 1, wherein the first PWM signal comprises multiple sub-signals respectively supplied to the DC-DC converters to generate multiple sub-output currents respectively supplied to multiple LED modules of the light source, wherein the multiple LED modules are different types with different light parameters.

14. The lighting apparatus of claim 13, wherein the sub-signals have a constant linear relation.

15. The lighting apparatus of claim 13, wherein the sub-signals are varied based on a predetermined mapping relation.

16. The lighting apparatus of claim 13, wherein when one sub-signal reaches a maximum value, other sub-signals are increased to compensate said one sub-signal to achieve a required light intensity of the light source.

17. The lighting apparatus of claim 1, wherein the controller sends the wireless command to the neighbor light device to adjust the light intensity of the neighbor light device based on the first PWM signal.

* * * * *